Nov. 3, 1953  J. F. RUDE ET AL  2,657,511
FLEXIBLE DISK HARROW

Filed Feb. 11, 1950  2 Sheets-Sheet 1

INVENTOR
JOHN F. RUDE
ALVAN V. BURCH
BY *Toulmin & Toulmin*
ATTORNEYS

Nov. 3, 1953  J. F. RUDE ET AL  2,657,511
FLEXIBLE DISK HARROW

Filed Feb. 11, 1950  2 Sheets-Sheet 2

INVENTOR
JOHN F. RUDE
ALVAN V. BURCH
BY *Toulmin & Toulmin*
ATTORNEYS.

Patented Nov. 3, 1953

2,657,511

UNITED STATES PATENT OFFICE 2,657,511

FLEXIBLE DISK HARROW

John F. Rude and Alvan V. Burch, Evansville, Ind., assignors to Burch Plow Works, Inc., Evansville, Ind., a corporation of Indiana Application February 11, 1950, Serial No. 143,775

3 Claims. (Cl. 55—81.1)

1

This invention relates to disc harrows of the tandem type, and more particularly to tandem harrows adapted to be attached to a power lift on a tractor for raising the harrow from the ground, particularly during transportation of the harrow.

Tandem disc harrows that are adapted to be attached to a power lift of a tractor have normally been provided with a rigid frame from which the disc gangs are suspended so that the frame could be lifted directly in the rear of the tractor and be supported rigidly while transporting the harrow. A rigid frame type of tandem disc harrow presents no particular difficulties when the harrow is in raised position since the rigid frame cannot swing about when supported in lifted position.

However, rigid frame tandem harrows have certain disadvantages in their flexibility of movement over the ground, or in turning corners or turning at the end of a field during harrowing, so that it is desirable to have a tandem harrow with a rear disc gang that is movable relative to the front disc gang to provide for ease of turning corners when dragging the harrow behind a tractor.

Such flexible tandem harrows, however, present a problem when it is desired to attach such harrows to the power lift of a tractor for the reason that with the rear gang free to move relative to the front gang in a sidewise direction, when the harrow is lifted from the ground, the rear gang can swing from one side to another, thus causing a dangerous condition when transporting such harrows on the road.

Also, it is desirable to limit the amount of rotation permissible of the rear disc gang of a tandem disc harrow to prevent the rear gang from striking the front gang when sharp corners are turned while dragging the harrow over the ground.

It is therefore an object of this invention to provide a tandem disc harrow in which the rear disc gang is free for movement relative to the front disc gang in a sidewise direction, and which movement is controlled within predetermined limits to prevent the rear gang from striking the front gang regardless of the sharpness of turn taken by a tractor while pulling the harrow over the ground.

It is another object of the invention to provide a tandem disc harrow in accordance with the foregoing object wherein means is provided on the front disc gang to control the amount of sidewise movement of the rear disc gang relative to

2 the front disc gang when the harrow is drawn over the ground.

It is still another object of the invention to provide a locking device that extends between the front disc gang and the rear disc gang which will prevent any sidewise movement of the rear disc gang relative to the front disc gang when the harrow is in lifted position relative to the tractor to which the harrow is attached.

It is still another object of the invention to provide a tandem disc harrow in accordance with the foregoing object wherein the locking device detachably connects the rear disc gang with the front disc gang of the harrow.

Further objects and advantages will become apparent from the drawings and the following description.

Figure 1:
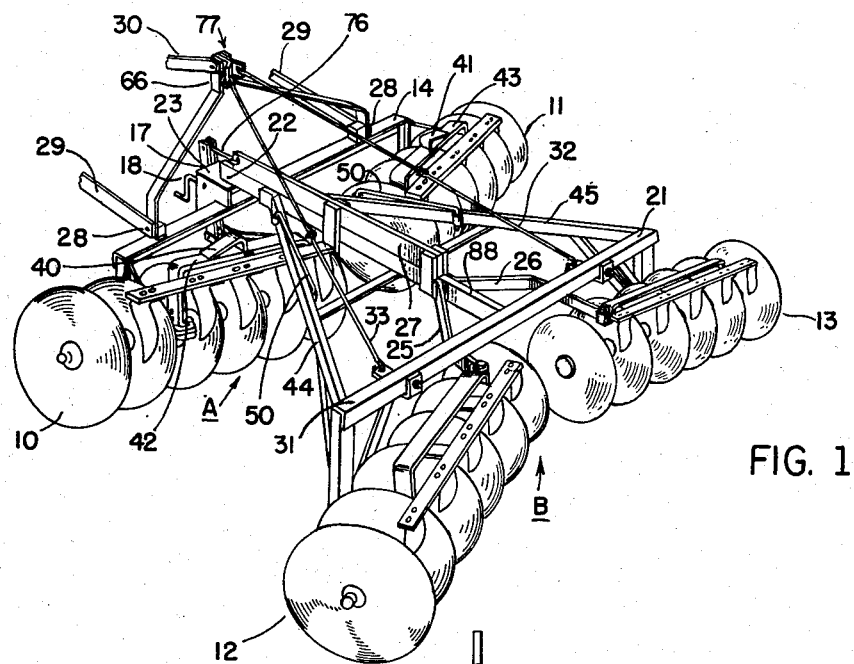
Figure 1 is a perspective elevational view of a tandem disc harrow incorporating the features of this invention.
Figure 2:
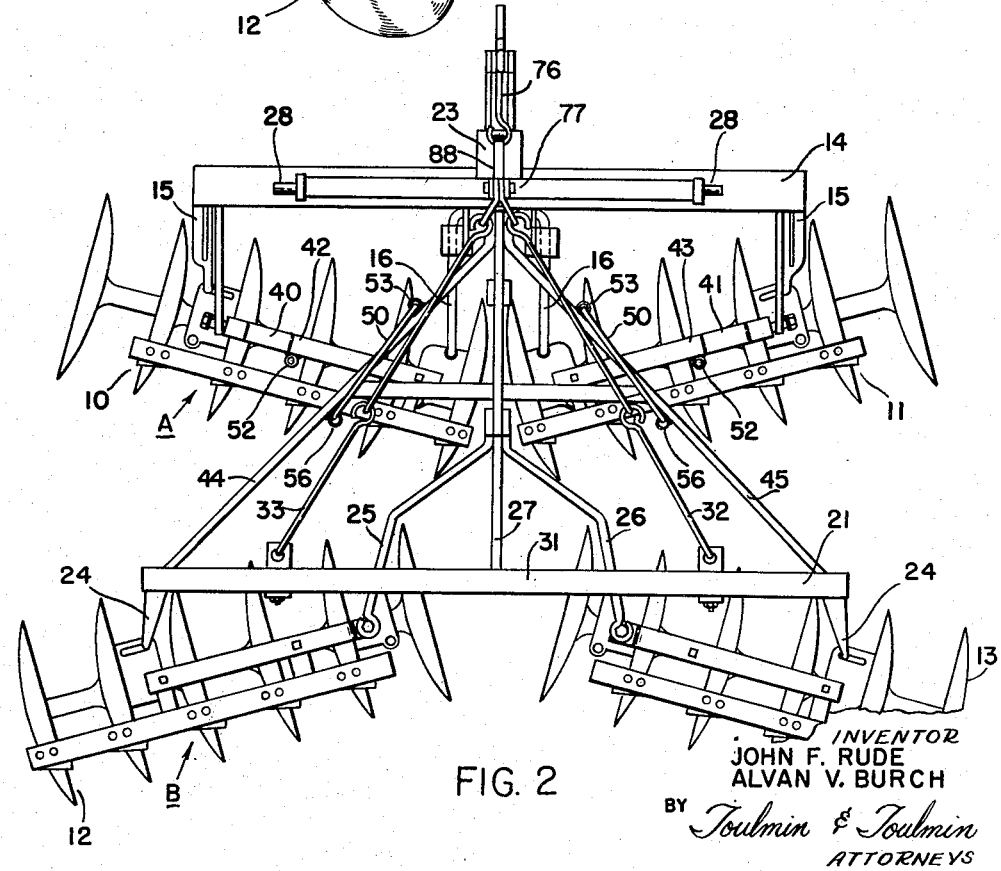
Figure 2 is an elevational plan view of the tandem disc harrow illustrated in Figure 1.

In this invention the tandem disc harrow consists of a front disc gang A and a rear disc gang B. The front disc gang A consists of the two separate disc gangs 10 and 11. Similarly, the rear disc gang consists of the separate disc gangs 12 and 13.

The front disc gangs 10 and 11 are connected with a draft frame 14 by means of outer draft links 15 and inner draft links 16. The inner draft links 16 are movable relative to the draft frame 14 by means of a link 17 that is connected with a hand-operated screw 18 that cooperates with a nut 19 secured to the draft frame 14. Thus, operation of the screw 18 causes oscillation of the link 17 about a pivot 20. Inward and outward movement of the lower end of the link 17 produces angling or straightening of the gangs 10 and 11.

The rear gangs 12 and 13 are connected with a triangular shaped draft frame 21 that has the forward end 22 pivotally carried on the plate 23 that connects with the forward draft frame 14.

The outer ends of the disc gangs 12 and 13 are connected with the draft frame 21 by means of draft links 24. The inner ends of the gangs 12 and 13 are connected with draft links 25 and 26 which in turn are connected with a movable bar 27 that reciprocates on the bar 88 whereby movement of the bar 27 causes angling or straightening of the rear gangs 12 and 13.

The forward end of the bar 27 is connected with the upper end of the link 17 by means of a link 76. Thus, oscillation of the link 17 about the pivot 20 produces simultaneous angling or straightening of the front and rear gangs A and B.

The tandem disc harrow is adapted to be connected to a power lift of a tractor. For this purpose the forward draft frame 14 is provided with a lift frame 77 at the lower ends of which there are provided pins 28. The pins 28 are connected with the lift bars 29 that extend rearwardly from the power lift of a tractor, and the upper end 66 of the lift frame 77 connects with a lift bar 30 that extends from the power lift of a tractor.

To provide for lifting of the rear gang B with lifting of the front gang A, the draft frame 21 has the rear frame bar 31 thereof connected with the upper end 66 of the forward lift frame 77 by means of connecting links 32 and 33. Thus, lifting of the forward draft frame 14 by the lifting mechanism will cause lifting of the rear draft frame 21.

Since the rear draft frame 21 is pivotally connected with the forward draft frame 14, as heretofore described, it will be apparent that when a turn is made by a tractor drawing the harrow over the ground, that the rear draft frame 21 and the disc gang B will swing from one side to the other relative to the forward disc gang A, depending on the direction of turn that is taken by the tractor. This is an advantageous feature in that much of the turning drag of the rear disc gang is eliminated, that is, relatively speaking, as compared to the turning drag created by the rear gang of a tandem disc harrow in which the rear disc gang is rigidly positioned on the harrow frame relative to the forward disc gang.

However, when making extremely sharp turns with a tractor, the freedom of movement of the rear disc gang will permit it to strike the forward disc gang, particularly when the gangs are in a rather steep angled position.

To overcome this difficulty, each of the forward disc gangs 10 and 11 is provided with angle stops 40 and 41 respectively that are carried on the frame bars 42 and 43 respectively of the gangs 10 and 11. These angle stops 40 and 41 are adapted to be engaged by the side bars 44 and 45 respectively of the rear draft frame 21 when the frame swings either to the right side or to the left side of the front gang A, thus limiting the degree of turning angularity that can be taken by the rear draft frame 21 relative to the forward draft frame 14. The limiting angle stops 40 and 41 thus prevent the rear disc gangs 12 and 13 from striking the front disc gangs 10 and 11 respectively whenever the tractor makes a turn while drawing the disc harrow over the ground.

When the forward and rear gangs are angled, as illustrated in Figure 1, there is need to restrict the side swing of the rear gang about the front gang to a greater degree than when the gangs are straight as there is less distance between the forward and rear gangs at this time. With the forward disc gangs connected to the forward draft frame 14 near the outer ends of the disc gangs 10 and 11, the angle stops 40 and 41 will rotate in an arc about the connections of the disc gangs 10 and 11 with the forward draft frame 14 when the gangs are moved from their straight position to an angled position. Thus, the angle stops 40 and 41 will approach the sides 44 and 45 of the triangularly shaped rear draft frame when the front gangs 10 and 11 are angled so that there will be a greater restriction or limitation on the amount of pivotal movement that can occur between the rear draft frame 21 and the forward draft frame 14 when the forward gangs 10 and 11 are in their angled position.

The flexibility of the rear disc gang B relative to the front disc gang A, as carried by the respective draft frames 21 and 14 produces another problem when the tandem harrow is in position lifted from the ground by the tractor power lift for transporting the harrow. This problem is that with the rear draft frame 21 pivotally connected to the forward draft frame 14, the rear draft frame 21 can swing from one side to another freely when the tandem harrow is in lifted position, being limited only in its swinging movement by the angle stops 40 and 41 on the front disc gangs 10 and 11 as heretofore described. However, this swinging movement produces a dangerous condition when transporting such a harrow on a public road.

To prevent such swinging movement when the harrow is in lifted position for transportation, a lock bar 50 is carried on either or both of the side frame bars 44 and 45 of the rear draft frame 21. This lock bar is more particularly illustrated in Figure 3 wherein the lock bar 50 is illustrated attached to the side frame bar 45 of the rear draft frame 21.

The lock bar 50 is a U-shaped bar having short depending legs 51 and 52 at each end of the bar. The depending leg 51 is positioned within an eye 53 formed by a metal tube suitably welded to the draft frame bar 45. The depending leg 51 is somewhat longer than the depending leg 52 so that the lock-bar 50 can be elevated from the position shown in Figure 3 to remove the depending leg 52 from the metal tube eye 54 suitably welded to the frame bar 43 of the disc gang 11. A cotter pin 55 extends through the depending leg 51 to prevent accidental removal of the lock-bar 50 from the frame member 45.

Figure 3:
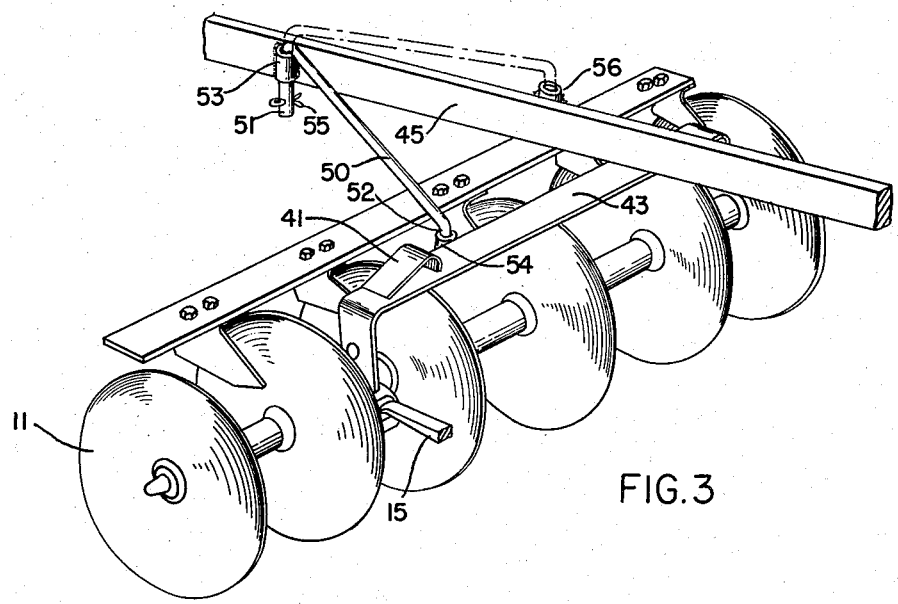
Figure 3 is an enlarged perspective view of the portion of the harrow illustrated in Figure 1, showing particularly the locking device between the front and rear disc gangs and the device for controlling sidesway of the rear disc gang relative to the front disc gang.
Figure 4:
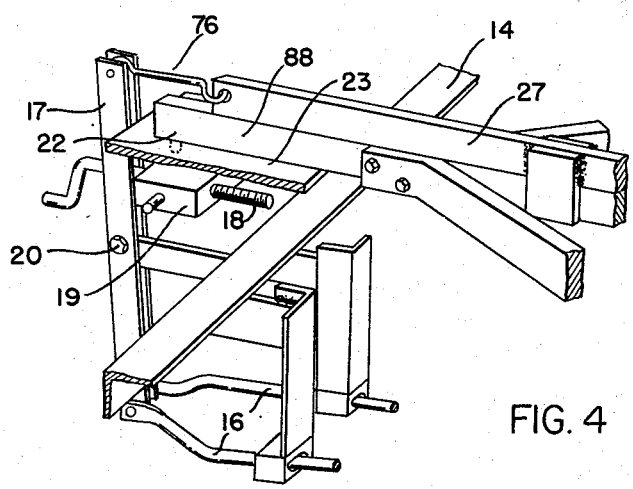
Figure 4 is a perspective view of the mechanism for angling the gangs.

The frame member 45 is also provided with a tubular eye 56 to receive the depending leg 52 of the lock-bar 50 when the bar is in inactive position shown in dot-dash lines in Figure 3.

When the tandem disc harrow is to be transported, the gangs A and B are placed in position with the axes of the cooperating bars of each gang A and B in alignment. The lock-bar is then placed in the position illustrated in Figure 3. With the rear draft frame 21 thus connected with the frame member of the forward disc gang, it is apparent that the rear disc gang 21 cannot swing from one side to another when the disc harrow is in elevated position so that at this time the draft frame 21 becomes immovable or rigid with the forward draft frame 14.

When the lock bar 50 is not in use, it is placed in the position shown in dot-dash lines in Figure 3.

While the apparatus disclosed and described herein illustrates a preferred form of the invention, yet mechanical alterations can be made without departing from the spirit of the invention, and all modifications that fall within the scope of the appended claims are intended to be included herein.

Having thus fully described our invention, what we claim as new and desire to secure by Letters Patent is:

1. In a tandem harrow, a pair of forward disc gangs operably connected with a forward draft frame and moveable relative thereto, a pair of rear disc gangs operably connected with a substantially triangularly arranged rear draft frame, said rear draft frame including pivot means at an apex of the frame pivotally connecting the same to said forward draft frame for complete freedom of horizontal movement of said rear draft frame and the disc gangs connected therewith about the forward disc gangs and the draft frame operably connected therewith independently thereof, and stop means on said forward disc gangs positioned adjacent opposite sides of said rear draft frame moveable with said forward disc gangs relative to said rear draft frame and engageable thereby to reducingly limit pivotal rotation of said rear draft frame and the gangs connected therewith about the forward disc gangs upon increasing angling thereof.

2. In a tandem harrow, a forward draft frame, a pair of forward disc gangs each including a frame member, means operably connecting each of said disc gangs near their outer ends with said forward draft frame, means operably connecting the inner ends of each of said forward gangs with said draft frame and including means for angling of said forward disc gangs relative to said draft frame, a pair of rear disc gangs, a generally triangularly shaped rear draft frame, means operably connecting the outer ends of each of said rear disc gangs with said rear draft frame, means connecting the inner ends of each of said rear disc gangs with said draft frame and including means for angling of said rear disc gangs relative to said rear draft frame, said rear draft frame having the apex portion thereof pivotally connected with said forward draft frame, said frame members of each of said forward gangs each having a projection thereon adjacent the sides of the triangularly shaped rear draft frame for engagement thereby upon rotation of said rear draft frame about said forward draft frame, said projections being movable with said forward gangs upon angling thereof about their connections at the outer ends thereof with said forward draft frame whereby to cause said projections to approach the sides of said triangularly shaped rear draft frame and reducingly limit pivotal rotation of said rear draft frame about said forward draft frame upon angling of said foward disc gangs.

3. In a tandem harrow, a forward disc gang mechanism including a draft frame operably connected therewith, a rear disc gang mechanism including a second draft frame operably connected therewith, said second draft frame including pivot means connecting the same to the forward draft frame for complete freedom of pivotal movement thereabout independently thereof, means forming a lift frame connected with said forward draft frame and said second draft frame and adapted to be connected with a power lift for elevating the harrow from the ground, and rigid link means forming a rigid detachable connection extending angularly between said mechanisms to maintain said second frame and the disc gang connected therewith in a fixed horizontal position relative to said forward disc gang with the link means extending therebetween when the harrow is in lifted position, said link means comprising a U-shaped member supported removably in sockets on one of said mechanisms, and socket means on the other of the mechanisms to detachably receive one end of said link means.

JOHN F. RUDE.
ALVAN V. BURCH.

References Cited in the file of this patent

UNITED STATES PATENTS

| Number | Name | Date |
|---|---|---|
| Re. 22,333 | White | June 8, 1943 |
| Re. 22,627 | McKay | Apr. 3, 1945 |
| 1,156,611 | Michael | Oct. 12, 1915 |
| 1,443,364 | Heylman | Jan. 30, 1923 |
| 1,489,020 | Smith | Apr. 1, 1924 |
| 1,621,622 | Brenneis | Mar. 22, 1927 |
| 1,725,409 | Mowry et al. | Aug. 20, 1929 |
| 1,830,993 | Furrer | Nov. 10, 1931 |
| 2,164,550 | Steward | July 4, 1939 |
| 2,584,238 | Sonneman | Feb. 5, 1952 |